Sept. 14, 1965                    H. GOLDEN                  3,205,729
                        VELOCIPEDE HANDLE BAR ACCESSORY
                           Filed March 31, 1964
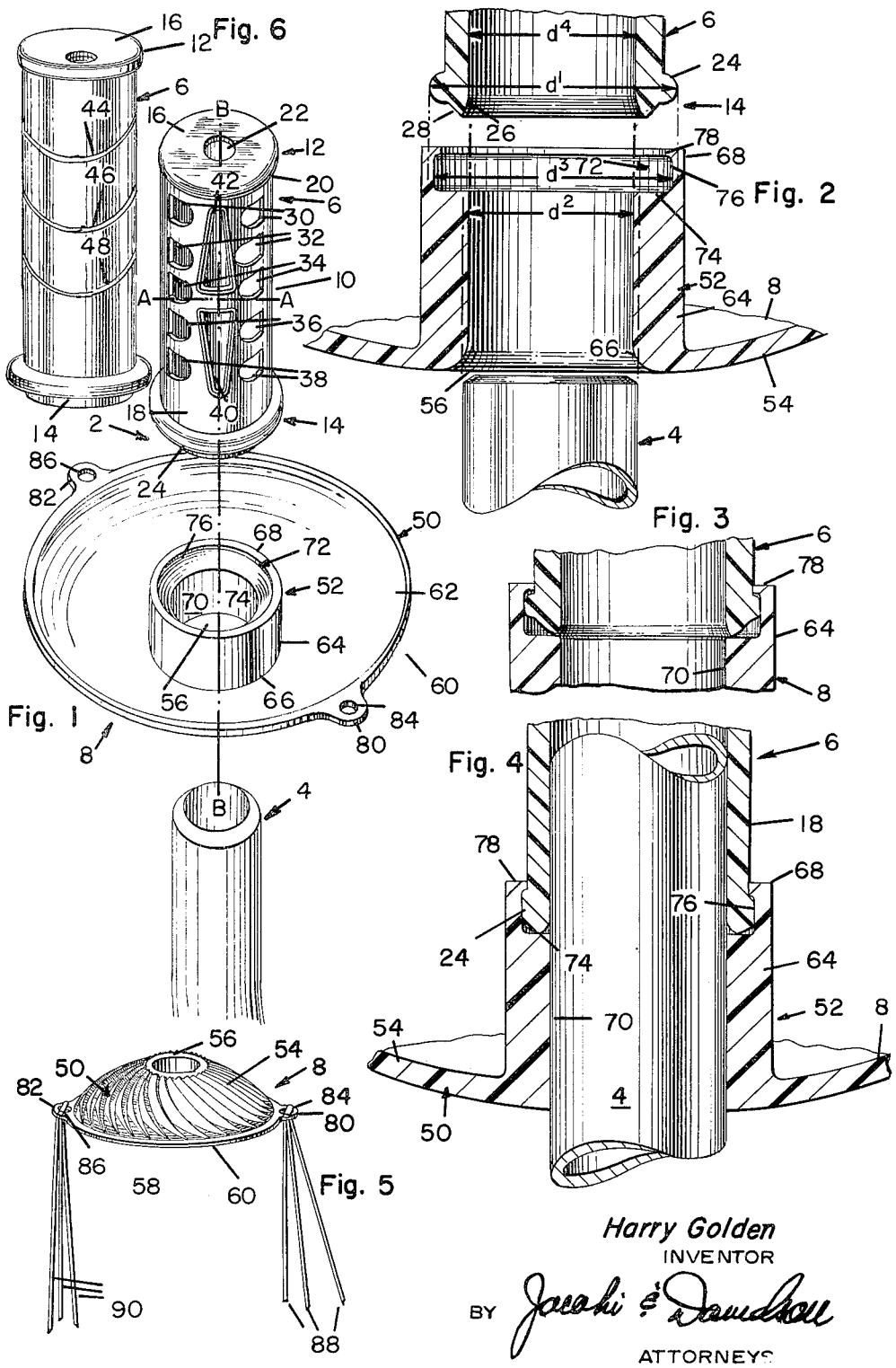
Harry Golden
INVENTOR

United States Patent Office 3,205,729
Patented Sept. 14, 1965

1

3,205,729
VELOCIPEDE HANDLE BAR ACCESSORY
Harry Golden, New York, N.Y., assignor to Ideas for Auto & Bike Specialties, Inc., New York, N.Y., a corporation of New York
Filed Mar. 31, 1964, Ser. No. 356,091
1 Claim. (Cl. 74—551.8)

This invention relates to a velocipede handle bar accessory and is particularly concerned with the provision of a pair of decorative handle bar accessories adapted to engage opposite ends of a conventional velocipede handle bar.

The normal handle bar steering unit used with vehicles, such as for example, a tricycle, usually includes a handle bar which extends horizontally above the front wheel or wheels and terminates at spaced ends in close spatial relation to the supporting seat on the tricycle. Usually, this handle bar assembly is of a metal or steel construction and the ends thereof usually are not finished off so as to present a smooth finish and pleasing appearance. Furthermore, the handle bar assembly is usually of a hollow construction so that the spaced ends thereof give the appearance of a hole through the handle bar. Of course, other types of handle bar assemblies can be used, but regardless of the type, such assemblies are commonly unattractive at the handle ends where the rider grasps the same for steering and support.

Bearing the above in mind, the present invention has as one of its primary objects the provision of a decorative handle bar accessory which can be easily attached to a handle bar assembly at the opposite ends thereof. Another primary object of the present invention in this regard is the provision of such an accessory which can be easily fixed in a desired ultimate position without requiring any tools, or any special dexterity or manipulating ability.

Another object of the present invention is the provision of a decorative handle bar accessory and method of assembling the same which includes at least two sections, and more particularly a handle grip section and a knuckle guard section both of which are adapted to frictionally engage one another and to be positioned upon a handle bar assembly in an easy and efficient manner.

Aside from the above basic objects of the invention there are certain equally important but somewhat more specific objects, including:

(a) the provision of a decorative handle bar accessory as prescribed above, which not only serves to afford the rider strong grasp of the handle bar and further protects the knuckles of the rider's hands from engaging a rough or open end of the handle bar, but in addition renders the general appearance of the handle bar assembly more attractive;

(b) the provision of such a handle bar accessory which can be manufactured inexpensively so as to be available for wide-spread use;

(c) the provision of such a handle bar accessory which is constructed so that it includes two principal members which are frictionally and releasably engaged with one another, and thereby permitting a change in design of either one of the members when desired without changing the entire handle bar accessory;

(d) the provision of such a handle bar accessory

2 which incorporates a separate handle grip member and a separate knuckle guard member both of which are easily attached to one another, and then attached to the handle bar assembly which latter attachment provides a positive locking engagement between the respective members of the handle bar accessory;

(e) the provision of such a handle bar accessory wherein the handle grip member is provided with a plurality of apertures in the peripheral surface thereof, which apertures serve a dual purpose of (1) affording a better grip of the handle bar, and (2) further giving a more pleasing appearance to the overall handle bar assembly;

(f) the provision of such a handle bar accessory wherein the knuckle guard member is also provided with a decorative contour to also give a pleasing appearance and wherein the structure of such member serves to provide a safety feature which prevents accidental scraping of the rider's knuckles or fingers by engagement of the same with a rough or open end of the handle bar; and (g) the provision of such a handle bar accessory wherein the knuckle guard member is further provided with a pair of spaced apart extensions having apertures therein for securing decorative streamers thereto which streamers react to the wind currents produced by the tricycle velocity and thus serve the purpose of giving an accelerating appearance to the tricycle itself.

In addition to the foregoing objects which are directed to the structural and functional aspects of the invention, as well as the method of assembling the same, it should be noted that an important but auxiliary object of the instant invention is to provide a decorative handle bar accessory conforming with the preceding objects, and which includes component parts which can be easily manufactured from plastic materials and through high speed injection molding techniques so as to minimize the manufacturing cost.

The invention will be better understood, and objects other than those specifically set forth above, will become apparent, when consideration is given to the following detailed description. Such description refers to the annexed drawings presenting a preferred and illustrative embodiment hereof.

In the drawings:

FIGURE 1 is an exploded perspective view of a complete decorative handle bar accessory constructed in accordance herewith;

FIGURE 2 is a section view showing the sections of the handle bar accessory disengaged from one another and separated from the handle bar unit;

FIGURE 3 is a sectional view showing the handle bar accessory components in engagement with one another but without the handle bar unit attached thereto;

FIGURE 4 is a sectional view similar to FIGURE 3, but showing the handle bar accessory secured to the handle bar unit;

FIGURE 5 is a perspective view of the knuckle guard member constructed in accordance herewith and further showing a pair of decorative streamers engaged therewith; and FIGURE 6 is a longitudinal side view of the handle grip member showing the back side of such member opposite the side shown in FIGURE 1.

If reference is first made to FIGURE 1, it will be noted that the handle bar accessory shown therein is generally designated by the reference numeral 2. Such accessory cooperates with a handle bar generally designated by the numeral 4 attached to the velocipede or tricycle in some conventional manner. It should be understood that although the present description is directed to a single handle bar accessory, the same is used in combination with another handle bar accessory for attachment to the other end or other side of the handle bar assembly. However, for purposes of description, only a single handle bar accessory is described herein. The handle bar accessory 2 comprises a handle grip member generally designated by the reference numeral 6 and a knuckle guard member generally designated by the reference numeral 8.

If reference is now made cumulatively to FIGURES 1 and 6, it will be noted that the handle grip member 6 comprises a one-piece polyolefin elongated tubular shaped member 10 having a first end generally designated by the reference numeral 12 and a second end generally designated by the reference numeral 14. As seen in FIGURE 1, the axis designated by the letters A—A intersects the tubular member 10 or the handle grip as such member is designated, substantially medially and transversely of the two ends 12 and 14. The first end designated by the numeral 12 of the handle grip member 6 has a closure portion 16 formed integrally with the peripheral surface 18 of the tubular handle grip member. Such closure 16 has a peripheral ridge 20 thereabout which extends above and around the end 12 of the handle grip member. Centrally disposed in this closure member 16, is an aperture 22 extending through the closure member and thereby communicating the hollow internal portion of the handle grip member with the outer surface of the closure member 16. The other end 14 of the tubular handle grip member 6 is also provided with a peripheral external ridge 24 extending above and around the end 14 of the handle grip member. As best shown in FIGURE 2, the end 14 of the handle grip member 6 terminates in an internally fluted outwardly extending surface portion 26 around the internal periphery thereof. Such fluted edge portion 26 extends outwardly from the internal bore along the inclined tapered portion 28 and terminates in the previously described peripheral ridge 24 extending about the end 14 of the handle grip member.

It should be here noted that the handle bar accessory 2 is manufactured from a polyolefin composition which includes polyethylene and polypropylene. Such composition has been found to provide for a more efficient manufacture of the components hereof as well as providing a low cost for the manufacture and sale thereof. Both the handle grip member 6 and the knuckle guard 8 are easily manufactured from these plastic materials by a high speed injection molding technique, commonly known and conventionally used in the manufacturing industry.

The peripheral surface 18 of the elongated tubular handle grip member 6 is provided on one side thereof with a plurality of pairs of apertures 30, 32, 34, 36 and 38 (FIGURE 1) equally spaced from an imaginary centrally disposed longitudinal axis designated by the letters B—B, on the tubular handle grip member. These apertures serve the dual function of affording a more sufficient grip by the rider as well as presenting a pleasing appearance to the overall handle bar accessory and further serve to allow a flow of air about the rider's hands and through the handle grip when the same is used on the handle bar of a velocipede. It should be understood, however, that such apertures are not necessarily limited to the shape and contour shown in FIGURE 1, but can take on any desired shape and contour consistent herewith. In this regard, the handle grip member 6 is further provided as shown in FIGURE 1 with a pair of oppositely spaced apart triangularly shaped apertures 40 and 42 extending from the imaginary transverse axis A—A toward the ends of the tubular handle grip member and further disposed about the imaginary longitudinal axis B—B. Again, it should be here understood that these apertures designated by the reference numerals 40 and 42 can also take on any desired shape and contour and consequently the present invention should not be limited thereby. As shown, the spaced apart apertures 30 through 38 extend substantially between the ends 12 and 14 of the tubular handle grip member as do the triangularly shaped apertures 40 and 42 which are disposed between opposite apertures of each pair on the tubular member.

Attention is now directed to FIGURE 6 wherein the handle grip member 6 is viewed from the opposite side of that shown in FIGURE 1 and showing a plurality of arcuately contoured ridges 44, 46 and 48 extending from the end 12 toward the end 14 of the handle grip member 6. These ridges provide spaces for the rider's fingers to be placed therebetween when grasping the same and riding the velocipede and thereby permitting a substantially strong grasp of the handle grip by the user.

Attention is now directed to that portion of FIGURE 1 showing the knuckle guard member 8 as well as FIGURES 2, 4 and 5. The knuckle guard member 8 includes a one-piece polyolefin body portion generally designated by the reference numeral 50 and an integrally attached centrally disposed stem portion generally designated by the reference numeral 52. The body portion 50 comprises a circular concave member 54 having an aperture 56 in the central portion thereof. The body portion circular concave member 54 is provided with a plurality of arcuately contoured ribs 58 extending from the central aperture 56 to the circular peripheral edge 60 of the body portion (FIGURE 5) and disposed in such a manner as to suggest a swirling effect. These arcuately contoured ribs 58 cover substantially the entire outer surface of the body portion 50 and the surface 54. Thus, when the same is mounted on the handle bar assembly 4 in a manner further described below, it presents to the user or rider of the velocipede a swirling or turning of the knuckle guard member with respect to the other parts of the vehicle. It should be understood, however, that these contoured ribs may assume any desired shape determined only upon the effect which is ultimately to be provided.

The stem portion 52 integrally connected to the inner portion 62 of the knuckle guard member comprises a hollow tubular member 64 having a first end 66 which is attached to the body portion of the knuckle guard member and a second end 68 longitudinally spaced from said first end 66. As best shown in FIGURES 1 and 2, the tubular member 64 has a bore 70 extending therethrough between said first and second ends and attached to the body portion of the knuckle guard member about the aperture 56. From this aperture, the stem portion extends outwardly from the body portion of the knuckle guard member toward the second end 68 thereof. The end portion of the stem 64 is designated as the second end 68 and is provided with a U-shaped recess generally indicated by the reference numeral 72 on the internal surface of the stem portion 52. This recess 72 has a first portion 74 extending outwardly from the bore 70, a second portion 76 extending upwardly as shown in FIGURE 2, from the first portion 74, and a third portion or lip member 78 which extends inwardly toward the bore to thereby define the U-shaped recess 72 in the outer or second end of the stem portion 52. It should be noted that the lip or third portion 78 of the U-shaped recess 72 extends inwardly toward the bore 70 but does not extend completely to the vertical plane extending from the internal diameter of the bore. Thus, a sufficient area is maintained for insertion of one end of the handle grip member 6, the manner of such insertion to be described below.

As seen in FIGURES 1 and 5, the outer edge 60 of the knuckle guard member body portion 50 is provided with a pair of spaced apart extensions 80 and 82 spaced approximately 180° apart, and being integrally formed and molded with the knuckle guard member. Each of these integral extensions 80 and 82 is provided with an aperture 84 and 86, respectively, extending through each of the extensions. A plurality of streamers 88 and 90 are provided, and are comprised of varying lengths of plastic or fabric material tied together at one end thereof so as to provide a suitable securing means for attachment to the knuckle guard member. These streamers are first passed through the apertures 84 and 86 in the extensions 80 and 82, respectively, and are either tied to the extensions or secured thereto in some other desired manner. Thus, when the rider of the velocipede accelerates the same or maintains a constant speed, the streamers are maintained in a substantially horizontal and flowing manner by the passing air currents thereabout. Such effect further adds to the swirling effect created by the arcuately contoured ribs 58 on the outer surface of the knuckle guard body portion.

In connection with FIGURES 2, 3 and 4, the assembly of the handle bar accessory first includes alignment of the handle grip member 6 with the knuckle guard member 8 so that the end 14 of the tubular portion 18 can be inserted into the U-shaped recess on the end 68 of the stem portion. As shown in FIGURE 2, the circular peripheral ridge 24 on the end of the handle grip member 6 has a diameter such as designated by the reference letter $d^1$ and the bore extending through the stem portion 52 as an internal diameter designated by the reference letter $d^2$, while the U-shaped recess has a maximum internal diameter designated by the reference letter $d^3$. In this regard, the peripheral ridge 24 on the handle grip member 6 must be forcefully engaged with the stem portion of the knuckle guard member 8 by pushing the two pieces together so as to frictionally engage the peripheral ridge 24 in the recess 72, as seen in FIGURE 3. Since the diameter $d^1$ of the peripheral ridge 24 is larger than the diameter $d^3$ of the recess 72, the ridge is partially flattened around the outer periphery thereof, as seen on FIGURE 3, so as to frictionally maintain the two members in engagement with each other.

After assembling the handle bar accessory components together, the same are engaged with the handle member 4 on the velocipede. By first pushing the knuckle guard member 8 onto the front of the handle bar, and passing the same through the bore 70 having a diameter $d^2$ slightly narrower than the diameter of the handle bar so as to frictionally maintain the same in engagement with one another, the handle bar is passed into the handle grip member 6 and through the tubular bore therein having a diameter represented by the reference letter $d^4$. It should be understood that the diameters $d^2$ and $d^4$ are substantially equal. Thus, the passing of the handle bar 4 past the U-shaped recess and interengaged peripheral ridge of the handle grip member, further flattens the peripheral ridge 24 as shown in FIGURE 4, so as to further frictionally engage the same together in a more complete manner than as shown in FIGURE 3. This increased pressure on the handle bar components maintained by passing the handle bar therethrough further serves to positively lock the handle grip and knuckle guard members together. The handle bar accessory is further pushed onto the handle bar until the end of the same engages the closure member 16 on the handle grip.

The important point to understand with regard to assembling the handle bar accessory and the handle bar itself, is that the handle bar accessory members are sufficiently flexible to permit interengagement of the members with each other as well as engagement of the overall accessory with the handle bar assembly. However, alternatively, both the knuckle guard member and the handle grip may be sufficiently flexible to permit the interengagement, or only the handle grip member itself may be so flexible. Regardless of the particular component or components which are made flexible for this purpose, the interengagement of the two members permits changing the appearance of the handle bar accessory merely with changing either the knuckle guard member of the handle grip member.

Although not specifically mentioned above, it will be appreciated that various configurations can be incorporated on the interior surface of the knuckle guard member about the concave surface thereof to give the same desirable appearances as is created on the outer surface of the knuckle guard member.

Having now described a preferred embodiment hereof in considerable detail, it will be appreciated that the objects set forth at the outset of the present specification have been successfully achieved. Accordingly,

What is claimed is:

A velocipede handle bar accessory comprising, in combination, a handle bar grip and a detachable knuckle guard, said handle grip including a one-piece polyolefin elongated tubular shaped member, said tubular member having first and second ends spaced from an imaginary transverse axis, said first end having a closure thereover integral with said tubular member, an aperture in said closure disposed centrally thereof, said closure having a peripheral ridge thereabout extending above and around said first end of said tubular member, said second end having a peripherally fluted internal edge extending outwardly therefrom and terminating in an inclined tapered surface having a peripheral external ridge extending above and around said second end of said tubular member, aperture means disposed on a portion of the outer peripheral surface of said tubular member, said aperture means comprising a plurality of pairs of apertures equally spaced from an imaginary centrally disposed longitudinal axis on said tubular member, said pairs of apertures substantially extending from said first end of said second end, a pair of spaced apart triangularly shaped apertures each extending from said imaginary transverse axis toward one end of said tubular member and disposed about said imaginary longitudinal axis and between the apertures of the respective pairs, said knuckle guard including a one-piece polyolefin body portion and an integral centrally disposed stem portion, said body portion comprising a circular concave member having an aperture in the central portion thereof, a plurality of arcuately contoured ribs extending from said central aperture to the edge on the outer surface of said body portion and disposed in such a manner as to suggest a swirling effect, said stem portion comprising a tubular member having first and second ends thereon, said tubular member having a bar therethrough of a first diameter, said first end being integrally molded to said body portion about said central aperture thereon, said stem portion extending outwardly from said body portion toward said second end thereof, said second end having a U-shaped recess on the internal surface of said stem portion, said recess having a first portion extending outwardly from said bore and a second portion extending toward said second end and a third portion extending inwardly toward said bore thereby defining said U-shape, said second end on said handle bar grip frictionally engaging said U-shaped recess in said knuckle guard stem portion whereby said handle bar passing through said stem portion and into said handle bar grip is adapted to expand said external ridge on said second end of said handle bar grip into said U-shaped recess and thereby positively lock said handle bar grip and said knuckle guard together on said handle bar and further including a pair of ornamental streamers, said knuckle guard being further provided with a pair of spaced apart extensions on the periphery of said body portion, each of said extensions having an aperture therein engaging one of said ornamental streamers so that the same are supported by said respective extensions.

References Cited by the Examiner

UNITED STATES PATENTS

| | | | |
|---|---|---|---|
| 172,607 | 1/76 | Carpenter | 74—543 X |
| 615,793 | 12/98 | Bowman | 74—551.9 |
| 2,506,197 | 5/50 | Burger | 74—551.8 |
| 2,618,986 | 11/52 | Hungerford | 74—551.9 |
| 2,844,047 | 7/58 | Schaeffer | 74—551.8 |

FOREIGN PATENTS

| | | |
|---|---|---|
| 688,541 | 2/40 | Germany. |
| 17,843 | 1895 | Great Britain. |
| 22,775 | 1896 | Great Britain. |
| 729,073 | 5/55 | Great Britain. |
| 515,768 | 2/55 | Italy. |

MILTON KAUFMAN, *Primary Examiner.*

BROUGHTON G. DURHAM, *Examiner.*